July 11, 1967  A. L. REDIGER ET AL  3,330,031
METHOD OF MANUFACTURING A ROTOR HAVING A LAMINATED CORE
Filed May 14, 1962  2 Sheets-Sheet 1
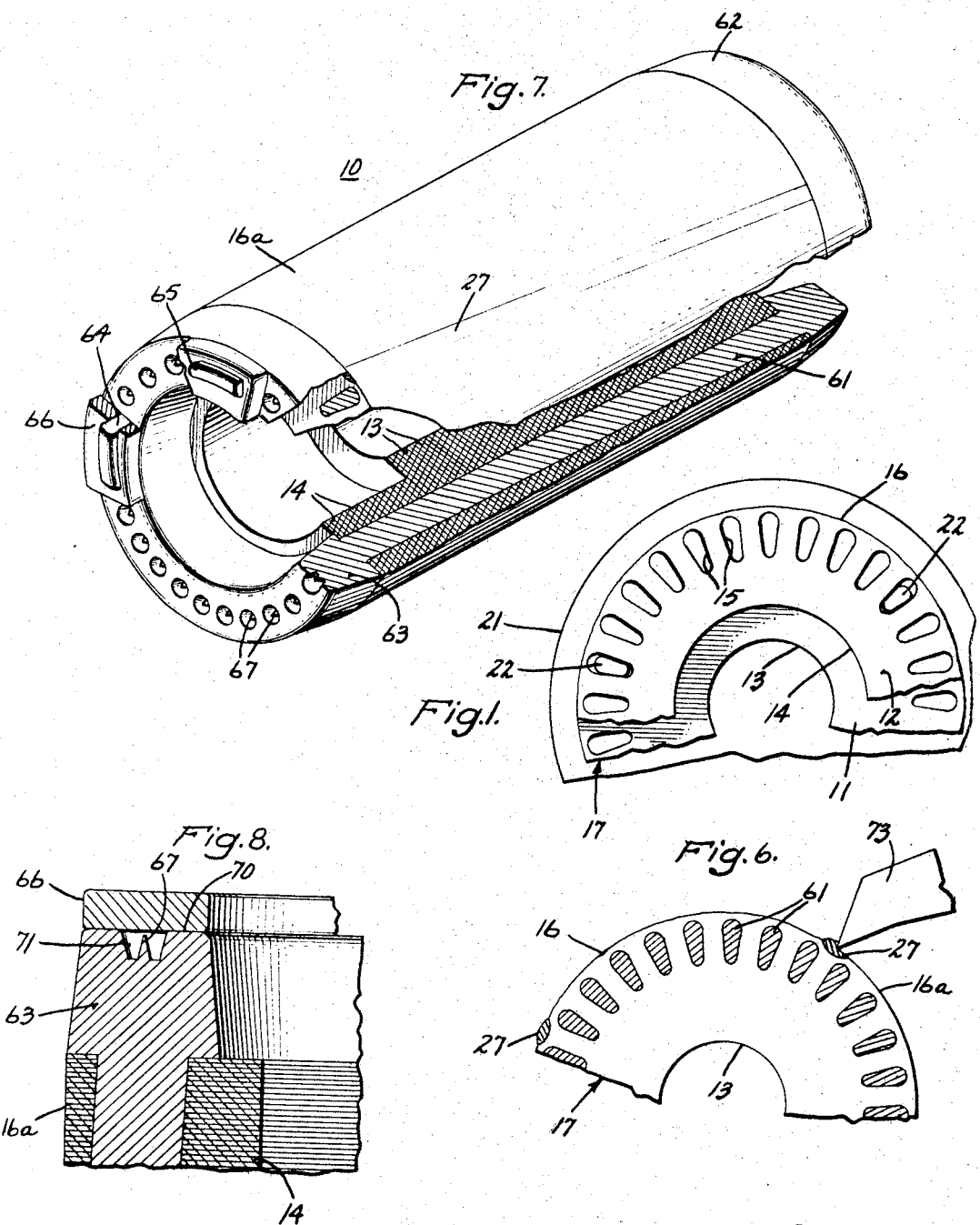
Inventors:
Alvin L. Rediger,
Julius Slager,
by John M. Stoudt
Attorney.

July 11, 1967     A. L. REDIGER ET AL     3,330,031
METHOD OF MANUFACTURING A ROTOR HAVING A LAMINATED CORE
Filed May 14, 1962     2 Sheets-Sheet 2
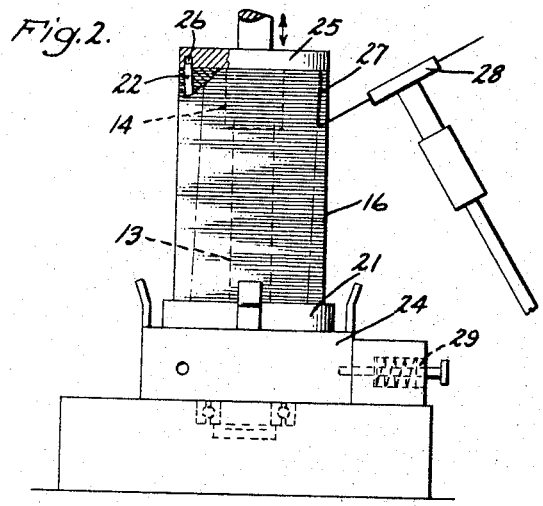
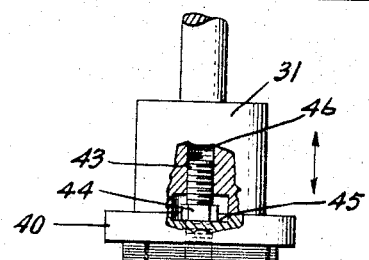
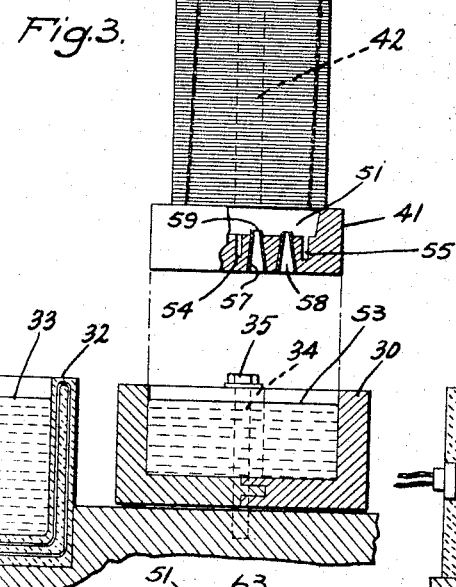
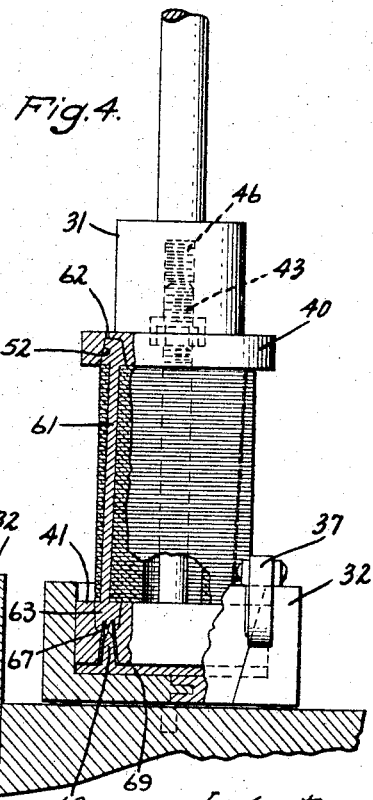
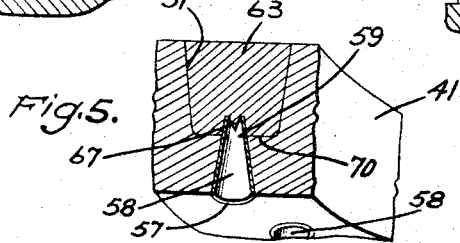

United States Patent Office 3,330,031
Patented July 11, 1967

3,330,031
METHOD OF MANUFACTURING A ROTOR HAVING A LAMINATED CORE
Alvin L. Rediger and Julius Slager, Holland, Mich., assignors to General Electric Company, a corporation of New York
Filed May 14, 1962, Ser. No. 194,540
3 Claims. (Cl. 29—598)

This invention generally relates to the manufacture of dynamoelectric machines and more particularly to an improved method of fabricating laminated rotors having cast squirrel-cage winding construction.

In the mass production of laminated rotors incorporating cast squirrel-cage windings, that is, conductor bars integrally joined at each end of a laminated stack by end rings, there has been a practical difficulty in providing accurately skewed conductor slots while maintaining economy in the fabrication of the rotors; i.e., relatively low equipment and process costs. In one approach, punched out laminations, formed with vent holes or ducts between the rotor bore and the slots, are initially stacked such that a number of spiraling pins enter the vent holes to skew the slots. The stacked laminations are then compressed by elaborate equipment and while held under compression, the squirrel-cage winding is cast on the stack by a pressure or centrifugal casting technique. Not only is this procedure costly due to the type of equipment and labor involved, but in addition where no vent holes exist in the laminations, it is impossible to follow this procedure to obtain an accurate skew of the slots.

With specific reference to the manufacture of rotors having counterbores and balance weights attached on studs made integral with end rings to compensate for an unbalance in the mass system with which the rotor is associated; e.g., a single piston compressor with a crankshaft introducing a dynamic unbalance into the system, difficulty has also been experienced in satisfactorily securing the laminations together, especially in the region of the counterbore where the bore of the laminations is in spaced relation to the stationary rotor supporting structure. Furthermore, when the balance weight mounting studs are integrally provided with one end ring, there is a tendency for the studs and winding to be cast with a non-uniform density as a result of (at least in part) voids contained in the hardened casting, which in turn adversely affect the conductivity of the winding and the dynamic balance of the rotor, both conditions being detrimental to the performance of the rotor.

Accordingly, it is a general object of the present invention to provide an improved and practical method of manufacturing laminated rotors having cast windings.

It is a more specific object of the invention to provide an improved and economically practical method of manufacture capable of producing structurally strong laminated rotors carrying cast windings of generally uniform density, the method insuring a minimum of variation in quality between rotors.

It is a further specific object of the invention to provide an improved method of fabricating a laminated rotor having cast windings in which the means for maintaining the laminations in alignment for the casting operation can, if desired, be readily employed to augment the structure strength of the finished article without creating dynamic unbalance of the rotor.

In carrying out the objects of the present invention in one form, we provide an improved method of manufacturing a rotor in which we initially assemble a number of laminations in loosely superposed relation, with skewing pins arranged on the lamination conductor slots to align the slots in skewed axial register. Thereafter, the stack is compressed and several shallow penetrating welds are applied on the stack periphery for the axial length of the stack to secure it into a unitary structure. A squirrel-cage winding is cast on the stack as the welds assist in maintaining the laminations under compression and thereafter the stack periphery is finished into a generally smooth cylindrical surface while coincidentally at least a portion of each weld is removed. With this arrangement, the welds not only serve as the means for holding the stack together, both before and during the casting operation to afford versatility in material handling and in operation sequences, but in addition if portions of the welds are allowed to remain, they will act to augment the structural strength of the finished rotor without introducing dynamic unbalance. Furthermore, this procedure may be followed to skew the slots even though the laminations do not include cooling vents or other notches generally considered to be essential for accurate slot skewing purposes before the present invention.

By a further aspect of the invention, in the casting operation we place dies adjacent the stack, disposed vertically, with the die cavities in communication with the slots for forming the squirrel-cage winding and, if desired, providing spaced apart balance weight supporting studs integrally on one end ring of the winding. The die cavity adjacent the lower end of the stack includes angularly spaced sprue ports projecting into the end ring cavity at generally equally spaced apart locations, several being arranged between the stud cavities. Molten or unhardened electrically conducting material, such as aluminum, is then introduced through the ports to fill the slots and cavities and subsequently hardened. In this way, sprues resulting from the casting operation will be recessed beneath the outer surface of the end ring and will not interfere with the mounting of balance weights on the studs next to the end ring, thereby eliminating any need for their removal by a subsequent machining operation. Further, casting voids and non-uniformity in material density are minimized to insure little variation in quality between mass produced rotors.

The subject matter which we regard as our invention is particularly pointed out and distinctly claimed in the concluding portion of this specification. Our invention, itself, however, both as to its organization and method of operation, together with further objects and advantages thereof may best be understood by reference to the following description taken in connection with the accompanying drawings which illustrate the preferred embodiment of the invention.

In the drawings:
FIG. 1 is a fragmentary top view of loosely arranged stamped out rotor laminations in stacked relation;
FIG. 2 is a side elevational view, partly broken away, illustrating the application of a weld on the periphery of the laminations of FIG. 1 when the conductor slots are disposed in skewed axial register and the stack is held under compression;
FIG. 3 is a partial side elevational view, broken away in parts, of the welded stack of laminations in position preparatory to the casting operation for forming the stack with a cast squirrel-cage winding;
FIG. 4 is a view similar to that of FIG. 3 illustrating the casting operation;
FIG. 5 is an enlarged fragmentary view in section of a portion of the die and sprue port structure of the equipment shown in FIGS. 3 and 4;
FIG. 6 is a fragmentary sectional view through the rotor, illustrating the step of finishing the periphery of the rotor into a smooth accurate dimension while simultaneously removing at least a portion of the welds;
FIG. 7 is a view in perspective, partially broken away to illustrate structural details, of the finished rotor fabricated in accordance with the preferred embodiment of the invention; and FIG. 8 is an enlarged fragmentary side view in section of a part of the rotor of FIG. 7 to show details.

Referring now to the drawings in more detail, for purposes of explanation, the preferred embodiment of the invention has been applied to the manufacture of an induction rotor 10 (FIG. 7), suitable for use in a motor-compressor unit to drive a single piston compressor (not shown) in which the compressor crankshaft introduces a dynamic unbalance into the mass system with which the rotor is associated. An example of this type of unit is illustrated in the patent of W. R. Hoffmeyer and J. H. Johnson, No. 3,157,805, filed May 8, 1961, and assigned to the same assignee as the present application.

In the present exemplification, FIGS. 1–6 inclusive disclose the preferred rotor fabricating procedure for carrying out our invention. More specifically, as shown in FIGS. 1 and 2, we initially assemble a predetermined number of disc shaped laminations 11 and 12, conventionally stamped out of magnetizable sheet iron or steel material. To illustrate the invention, laminations 11 and 12 include central holes 13 and 14 respectively, and a plurality of angularly spaced apart closed conductor slots 15 disposed radially beyond the central holes and adjacent periphery 16 of laminations, which is somewhat rough from the tearing action in the punch operation. In order to achieve a skew of the conductor slots and the proper alignment of the central holes, the laminations may be loosely arranged in a stack 17 on a suitable fixture (see FIG. 2), in which a base 21 is provided with three angularly spaced apart (e.g., approximately 120°) upright rods or pins 22 for receiving slots 15 and spiralling them at the proper angle to form skewed conductor passageways extending entirely through the stack. Central holes 13 are aligned to furnish a bore adapted to have an interference fit with a rotatable shaft (not seen) and enlarged holes 14 of laminations 12 provide a counterbore for accommodating a part of the stationary rotor supporting structure of the motor-compressor unit (not shown) in spaced relation.

After the laminations have been arranged on the fixture as previously described, they are then compressed axially with approximately the same force as that required for the subsequent casting operation. Generally speaking, the necessary minimum force is in the neighborhood of 100 pounds per square inch of gross punching area. While stack 17 is held in axial compression, several welds are applied in a predetermined fashion (to be explained hereinafter) on peripheral surface 16 to secure the laminations firmly together in the desired relation for subsequent fabrication steps. FIG. 2 shows one inexpensive yet satisfactory manner in which the foregoing may be readily accomplished. The equipment includes a rotatable turntable 24 on which base 21 is fixedly attached and a revolvable piston assembly 25, having apertures 26 to complement the ends of skewing rods 22, and capable of regulated compressive movement toward and away from turntable 24.

It should be noted at this time that we prefer to fuse the skewed or spiraled stack of laminations together by at least two, preferably three but not substantially more, light or shallow welding beads 27, provided in generally equally spaced apart angular relation on the peripheral surface 16 of stack 17. These beads should extend the longitudinal length of the stack on the solid portion thereof, intermediate and parallel to adjacent the conductor passageways defined by slots 15. Preferably the depth of weld penetration into the stack is shallow in extent; that is, the penetration should be such that during the turning down step in which the peripheral surface of the stack is finished into an accurately dimensioned cylindrical surface (FIG. 6), a greater portion, if not all, of the welding bead itself may be readily removed. As an example, for a nominal three inch diameter stack, the penetration should not be substantially in excess of $\frac{1}{16}$ inch beyond the finished peripheral surface of the stack. In this way, the possibility of introducing undesirable and uncontrolled dynamic unbalance and rotor noise are essentially prevented.

In actual practice, satisfactory results have been obtained with the use of a commercially available arc welding machine employing inert tungsten, with the welding head 28 suitably mounted to move parallel to the skew of the laminations. The welding machine, one of straight polarity, had the following characteristics: welding current—150 to 160 amps.; welding voltage—10 volts; weld speed—40 to 50 inches/minute; electrode diameter—$\frac{3}{32}$ inch; and pure argon shielding gas flowing between 15 to 20 cubic feet per hour. For indexing turntable 24 to lock the stack in the proper location relative to welding head 28, a common plunger assembly 29 may be utilized. Once the welding operation has been completed, piston 25 is raised and the stack of laminations removed from fixture 20.

The welded together stack may be annealed in the conventional way for stress relieving purposes and either stored for subsequent use or conveniently transported by conveyor (not shown) to the casting operation. It will be appreciated that, among other things to be explained hereinafter, welds 27 function as a temporary holding fixture for maintaining the stack of laminations under compression both prior to and during the casting process, now to be described in connection with a pressure type aluminum casting procedure shown in FIGS. 3 and 4.

Turning now to the illustrated pressure type casting apparatus employed in the casting operation, it comprises a casting chamber 30 and a pressure ram head 31 positioned directly above the chamber and capable of being reciprocated relative to the chamber by any suitable means, as by a hydraulic driving piston. Chamber 30 is formed in halves which are hinged at 34 upon a trunnion shaft 35 mounted in a suitable base 36. The two halves are normally held together by a detachable connection or latch 37. A heated pot 32 containing a supply of molten casting material 33, e.g., aluminum, is located on base 36 next to chamber 31 for conveniently transmitting the correct amount of molten material by a ladle or the like to chamber 30 at the start of each casting cycle.

The casting dies for forming the squirrel-cage winding include an upper die plate 40 (as viewed in the drawings), adapted to be removably positioned at one side face of stack 17, and a lower die plate 41 for mounting at the other side of the stack, adjacent the counterbore of the rotor in the exemplification. The plates are maintained in tight engaging relation at the stack side faces for the casting process by a rod 42 fastened at one end to the center of lower plate 41 and extending up through the bore of the stack. The other end of the rod passes through plate 40 and is locked thereto by the threaded interengagement between externally threaded rod end 43 of the upper end of rod and a nut 44 partially received in plate depression 45. Through the threaded engagement of an internally threaded hole 46 formed in ram head 31 and the externally threaded rod end 43, the laminated stack and the attached die plates may move as a unit with the ram head.

With reference to the preferred casting die forms, plates 40 and 41 respectively include generally annular end ring forming cavities 52 and 51 respectively each having a somewhat U-shaped molding wall in communication with the ends of the skewed conductor passageways defined by slots 15 for admission of molten metal, denoted by number 53 in FIG. 3. Lower die plate 41 is provided with a pair of spaced apart elongated slightly tapering downwardly extending weight supporting stud cavities 54 and 55. As shown in FIG. 3, the casting entrances of the stud cavities are contained on the bottom wall (as viewed in the drawing) of cavity 51. A plurality of spruing ports 57 for the introduction preferably of metal 53 from chamber 30 to the cavity 51, frusto-conical in configuration and corresponding in number to the number of conductor passageways incorporated in the rotor, are disposed around the bottom wall of cavity 51, several of the ports being included between stud cavities 54 and 55. An insert or sleeve 58 is positioned in each port such that its egress 59 projects a short predetermined distance into cavity 51. The taper of the ports and inserts is in the neighborhood of 5°, with the egress having minimum cross section area for locking and fluid guiding purposes.

For best casting results, the egress cross-section area for the individual inserts should be subtantially in the range 0.0069 to 0.0145 square inch, and the ratio of the weight of the casting material in pounds relative to the total egress area in inches should be below seven. As will become more apparent hereinafter, the casting arrangement just described eliminates the necessity of machining off sprues normally formed during the casting process while permitting the easy and inexpensive replacement of parts, such as inserts 58, after long continued use. Further, during the casting operation the foregoing minimizes the possibility of "cold flow" of the casting material and other undesirable causes of voids, to assure a filling of the cavities and a winding and supporting studs of enhanced uniform density.

Referring now in particular to the casting procedure, operation is initiated with the component parts in the position shown in FIG. 3, that is, with the assembled die, stack, and ram head unit raised above chamber 30 which has the requisite amount of molten aluminum. Head 31 is lowered at a speed of 65–75 feet per second until lower die plate 41 enters the confines of chamber 30. Continued downward movement of the plate 41 causes the molten or unhardened aluminum to be forced upwardly with a preselected pressure through inserts 58, first into cavities 51, 54 and 55, then through the slot passageways into upper cavity 52, filling all casting spaces in the stack and plates. Trapped gases in the dies may be exhausted to the atmosphere through vents in die 40 which are sufficiently small to prevent the escape of molten metal from the casting cavities.

Since stack 17 and the die plate are at a lower temperature than the molten aluminum, they absorb heat from the aluminum, hardening it. It will be observed from FIG. 4 that the hardened aluminum in the dies and stack 17 provide conductor bars 61 in the slot passageways, integrally joined at each end by annular end rings 62 and 63, to form the squirrel-cage winding, as well as studs 64 and 65 for supporting balance weights 66 (FIG. 7). In addition, as seen in FIGS. 4 and 5, with the egresses 59 of the frusto-conical shaped port inserts 58 extending upwardly into bottom cavity 51, a conical sprue 67 is produced within egress 59 which mates in a point contact with hardened upstanding runners 68 of an excess metal slug 69. Upon upward movement of ram head 31 once again to the raised position of FIG. 3, sprues 67 and runners 68 shear at a point beneath the outer surface 70 (FIG. 5). Consequently, egresses 59 furnish tapered recesses 71 in end ring 63 surrounding sprues 67 which do not have to be removed by a subsequent machining step, Hardened slug 69 may thereafter be returned to heated pot 32 to be liquefied for reuse.

Upon completion of the casting procedure, die plates 40, 41 and stack 17 are dismantled from ram head 31 and the laminated stack is dissassembled from between the plates. Thereafter stack 17 is transferred to the final turning operation, illustrated by FIG. 6, where the outer periphery of the stack is turned down to an accurate diameter by any suitable means, such as cutting tool 73, to produce an accurately dimensioned smooth finished rotor surface 16a. Coincident with this surface finishing step, a major portion, but not necessarily all, of each weld 27 is removed. Either before this finishing step is performed or after it has been accomplished, balance weights 66 (one being shown in FIGS. 7 and 8) can be secured in place on studs 64 and 65 by a simple staking procedure.

The completed rotor 10, formed in accordance with the preferred embodiment of our invention, is shown in FIGS. 7 and 8, revealing certain advantageous features of the invention, especially significant when the rotor is of the type having balance weights and a counterbore at one end for accommodating a part of the rotor supporting structure. An improved cast winding and studs of enhanced uniform density are provided, and in spite of the fact that casting sprues 67 have not been removed by a machining operation, balance weights may be attached in close proximity to outer surface 70 of the end ring 63 without interference in the mounting by the sprues. Moreover, rotor 10 may include accurately skewed conductors whether or not the rotor incorporates vent holes or ducts. In addition, if desired, not all of welds 27 need b removed and while augmenting the structural strength of the rotor, especially critical when the rotor includes a counterbore and runs at elevated temperatures at which the winding expands, resulting in the loss of friction between the laminations, the remaining portion of the welds will not adversely affect the dynamic balance and noise characteristics of the rotor.

It should be apparent to those skilled in the art, while we have shown and described what at present is considered to be the preferred embodiment of our invention in accordance with the patent statutes, changes may be made in the structure disclosed without actually departing from the true spirit and scope of this invention, and we therefore intend to cover in the following claims all such equivalent variations as fall within the invention.

What we claim as new and desire to secure by Letters Patent of the United States is:

1. A method of manufacturing a laminated rotor from a plurality of laminations each having a central hole and a plurality of angularly spaced apart conductor slots disposed radially beyond said hole comprising the steps: assembling a stack of said laminations in loosely arranged superposed relation with said slots in axial register; compressing the stack, and while maintaining said stack in compression, positioning dies adjacent said stack with the dies having cavities in communication with said slots for forming end rings and spaced apart balance weight supporting studs on at least one end ring, and having angularly spaced apart sprue ports with inserts projecting into at least one of said end ring cavities and between the stud cavities; introducing unhardened casting material through said ports and inserts to fill said cavities and slots; forming integrally cast slot conductors interconnected at each end by winding end rings to provide a cast squirrel-cage winding and integrally cast studs and angularly spaced apart recessed sprues on at least one of said rings; and mounting balance weight means onto said studs adjacent the outer surface of said end ring over several of said recessed sprues in their integrally cast forms.

2. A method of manufacturing a laminated rotor from a plurality of disc shaped laminations each having a central hole and a plurality of angularly spaced apart conductor slots disposed radially beyond said hole, comprising the steps: assembling a stack of said laminations in loosely arranged superposed relation and aligning said slots in axial register to provide continuous conductor accommodating passages through the stack; compressing the stack and while maintaining the stack in compression, forming at least two shallow welds in angularly spaced apart relation on the stack periphery for the axial length of the stack to hold the stack in compression and to secure it into a unitary structure; positioning dies adjacent said stack, with the dies including cavities for forming end rings arranged in communication with said slots and including sprue port inserts projecting into at least one of said cavities; introducing molten material through said port inserts and filling said cavities and slots to provide slot conductors interconnected at each end by windings while said welds maintain the stack of laminations under compression; hardening said material to form a cast squirrel-cage winding; and finishing the periphery of the stack into a generally smooth cylindrical surface while coincidentally removing at least a portion of each weld.

3. A method of manufacturing a laminated rotor from a plurality of disc shaped laminations each having a central hole and a plurality of angularly spaced apart conductor slots disposed radially beyond said hole, comprising the steps: assembling a stack of said laminations in loosely arranged superposed relation and skewing said slots in axial register to provide continuous conductor accommodating passages through the stack by placing rods through at least two sets of slots; forming at least two shallow welds in angularly spaced apart relation on the stack periphery generally between and parallel to adjacent slots for the axial length of the stack to secure it into a unitary structure; disassembling the rods and stack relative to each other; positioning dies adjacent said stack, with the dies including cavities in communication with said slots for forming end rings and spaced apart balance weight supporting studs on at least one end ring, said dies further including a plurality of angularly spaced apart sprue ports with inserts projecting into at least one of said cavities with several ports being between the studs; introducing molten material through said ports and inserts to fill said cavities and slots, and casting integral conductors interconnected at each end by end rings to provide a cast squirrel-cage winding having at least one cast end ring with integrally cast studs thereon and with angularly spaced apart integrally cast recessed sprues; finishing the periphery of the stack into a generally smooth cylindrical surface while coincidentally removing at least a portion of each weld, and mounting balance weight means onto said studs adjacent the outer surface of said one end ring over several of said recessed sprues as integrally cast.

References Cited

UNITED STATES PATENTS

| | | | |
|---|---|---|---|
| 1,603,544 | 10/1926 | Johnson | 22—116 |
| 2,065,213 | 12/1936 | Dolan et al. | 29—155.53 XR |
| 2,125,970 | 8/1938 | Waters | 29—155.53 XR |
| 2,138,661 | 11/1938 | Maxwell | 29—155.53 |
| 2,248,167 | 7/1941 | Elsey | 29—155.53 XR |
| 2,370,458 | 2/1945 | Goran | 310—211.0 |
| 2,657,324 | 10/1953 | Korski | 310—211.0 |
| 2,739,253 | 3/1956 | Plumb | 310—42 XR |
| 2,788,436 | 4/1957 | Young et al. | 29—155.53 XR |
| 2,807,844 | 10/1957 | Hemphill | 29—155.53 XR |
| 2,917,643 | 12/1959 | Mihanowich | 310—42 |
| 2,998,638 | 9/1961 | MacLaren | 29—155.53 |
| 3,012,162 | 12/1961 | Rediger | 310—217 XR |

FOREIGN PATENTS 691,446  6/1953  Great Britain.

JOHN F. CAMPBELL, Primary Examiner.

MILTON O. HIRSHFIELD, Examiner.

R. W. CHURCH, P. L. McBRIDE, Assistant Examiners.